(12) United States Patent
Cerino et al.

(10) Patent No.: US 10,154,083 B1
(45) Date of Patent: Dec. 11, 2018

(54) RELEASE STATUS INDICATOR FOR A MULTI-USER CAX ENVIRONMENT

(71) Applicant: United Technologies Corporation, Farmington, CT (US)

(72) Inventors: Joseph N. Cerino, Middletown, CT (US); Joshua Daniel Winn, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 241 days.

(21) Appl. No.: 15/014,109

(22) Filed: Feb. 3, 2016

(51) Int. Cl.
*G06F 15/173* (2006.01)
*H04L 29/08* (2006.01)
*H04L 29/06* (2006.01)

(52) U.S. Cl.
CPC .............. *H04L 67/10* (2013.01); *H04L 67/42* (2013.01)

(58) Field of Classification Search
CPC .................................. H04L 67/10; H04L 67/42
See application file for complete search history.

(56) References Cited

U.S. PATENT DOCUMENTS

| 8,229,715 B1 | 7/2012 | Teller et al. | |
| 9,781,126 B1* | 10/2017 | Winn | H04L 63/105 |
| 2013/0144566 A1* | 6/2013 | De Biswas | G06T 17/005 |
| | | | 703/1 |
| 2013/0239011 A1* | 9/2013 | Red | G06T 5/00 |
| | | | 715/743 |
| 2014/0149882 A1 | 5/2014 | Nysetvold et al. | |
| 2014/0222387 A1 | 8/2014 | Cannon et al. | |
| 2014/0222919 A1 | 8/2014 | Nysetvold et al. | |
| 2014/0236550 A1 | 8/2014 | Nysetvold et al. | |

OTHER PUBLICATIONS

"Migrate Released or Locked CAD Files". Posted at <https://knowledge.autodesk.com/support/inventor-products/troubleshooting/caas/CloudHelp/cloudhelp/2016/ENU/Inventor-Install/files/GUID-B2064505-0C2B-442F-9828-2370AD0C66A7-htm.html> on Nov. 23, 2015.*

Moncur, Robert. "Data Consistency and Conflict Avoidance in a Multi-User CAx Environment". Jul. 19, 2012.*

Xu, Yue, A Flexible Context Architecture for a Multi-User GUI, Thesis, Dec. 2010, Department of Mechanical Engineering, Brigham Young University.

(Continued)

*Primary Examiner* — Scott B Christensen
(74) *Attorney, Agent, or Firm* — Carlson, Gaskey & Olds, P.C.

(57) ABSTRACT

A system for collaborating on a component includes a first computing device configured to execute a first multi-user CAx environment and a plurality of second computing devices, each being configured to execute a corresponding second multi-user CAx environment. Each of the second multi-user CAx environments includes a display module configured to cause the corresponding second device to display at least a portion of a component, the component including a plurality of subcomponents wherein at least one of the subcomponents is a released subcomponent, and the first multi-user CAx environment including a first release tracking module configured to cause each of the second multi-user CAx environments to display a visual indication of a released status of the released subcomponent.

10 Claims, 6 Drawing Sheets

(56) References Cited

OTHER PUBLICATIONS

Red, Edward, David French, Ammon Hepworth, Greg Jensen, and Brett Stone, Multi-User Computer-Aided Design and Engineering Software Applications, Cloud-Based Design and Manufacturing (CBDM), Jan. 1, 2014, pp. 25-62, Springer International Publishing.
Red, Edward, Greg Jensen, Jordan Ryskamp, and Kenneth Mix, NXConnect: Multi-User CAx on a Commercial Engineering Software Application, Department of Mechanical Engineering, Brigham Young University. 2010 PACE Global Annual Forum.

* cited by examiner

RELEASE STATUS INDICATOR FOR A MULTI-USER CAX ENVIRONMENT

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one exemplary embodiment a system for collaborating on a component includes a first computing device configured to execute a first multi-user CAx environment, a plurality of second computing devices, each being configured to execute a corresponding second multi-user CAx environment. Each of the second multi-user CAx environments includes a display module configured to cause the corresponding second device to display at least a portion of a component, the component including a plurality of subcomponents wherein at least one of the subcomponents is a released subcomponent, and the first multi-user CAx environment including a first release tracking module configured to cause each of the second multi-user CAx environments to display a visual indication of a released status of the released subcomponent.

In another exemplary embodiment of the above described system for collaborating on a component the visual indication is an icon displayed on at least one surface of the released subcomponent.

In another exemplary embodiment of any of the above described systems for collaborating on a component the visual indication is one of a shading effect and a transparency effect applied to a visual representation of the released subcomponent.

In another exemplary embodiment of any of the above described systems for collaborating on a component each of the second multi-user CAx environments includes a second release tracking module, the second release tracking module being configured to operate in conjunction with the first release tracking module.

In another exemplary embodiment of any of the above described systems for collaborating on a component each of the second release tracking modules is configured to apply the visual indication based on a released status received from the first release tracking module.

Another exemplary embodiment of any of the above described systems for collaborating on a component further includes a product life management (PLM) system connected to the first computing device, and wherein a released status of each subcomponent and a released status of the component is stored in the PLM system.

In another exemplary embodiment of any of the above described systems for collaborating on a component the first multi-user CAx system is configured to indicate a status of each subcomponent as released in response to the PLM system indicating the component is released.

In another exemplary embodiment of any of the above described systems for collaborating on a component the first multi-user CAx environment includes an authorization module configured to prevent a non-designated second multi-user CAx environment form reverting a released status.

In another exemplary embodiment of any of the above described systems for collaborating on a component a designated second multi-user CAx system is one of a second multi-user CAx system originating the released status and a second multi-user CAx system operated by a user having a user access level in excess of a pre-determined threshold.

An exemplary method for operating a multi-user CAx environment includes receiving a request to access at least a portion of a part file at a host computer from at least two distinct client computers, each of the client computers and the host computer operating a shared multi-user CAx environment, checking a release status of each of a plurality of sub-component within the at least a portion of the part file at the host computer via a release status tracking module, and providing a visual indication on a released sub-component within the plurality of sub-components in a viewing frustum of each of the client computers, the visual indication indicating that the sub-component is released.

Another example of the above described exemplary method for operating a multi-user CAx environment includes providing a visual indication comprising at least one of displaying an icon on one or more surfaces of the released sub-component, coloring one or more surfaces of the released sub-component, and shading one or more surfaces of the released sub component.

Another example of any of the above described exemplary methods for operating a multi-user CAx environment further includes preventing operations originating from each of the client computers from altering the released sub-component.

Another example of any of the above described exemplary methods for operating a multi-user CAx environment includes rein checking the release status of each of the plurality of sub-components within the at least a portion of the part file comprises querying a connected product life management (PLM) system, and flagging all sub-components within the plurality of sub-components as released when the part file is listed as being release in the PLM system.

Another example of any of the above described exemplary methods for operating a multi-user CAx environment further includes authorizing a reversion of a determined release status in response to determining that a client computer originating a reversion request is a designated computer.

In another example of any of the above described exemplary methods for operating a multi-user CAx environment the client computer is determined to be a designated computer in response to an authorization module determining that a user operating the client computer originating the request is a user who originated the release status.

In another example of any of the above described exemplary methods for operating a multi-user CAx environment the client computers is determined to be a designated computer in response to an authorization module determining that a user operating the client computer originating the request has an authorization in excess of a predetermined authorization threshold.

Another example of any of the above described exemplary methods for operating a multi-user CAx environment further includes forking a part file in a connected product life management (PLM) system in response to a non-designated client attempting an operation that would modify a released sub-component within the plurality of sub-components.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

DETAILED DESCRIPTION

Figure 1:
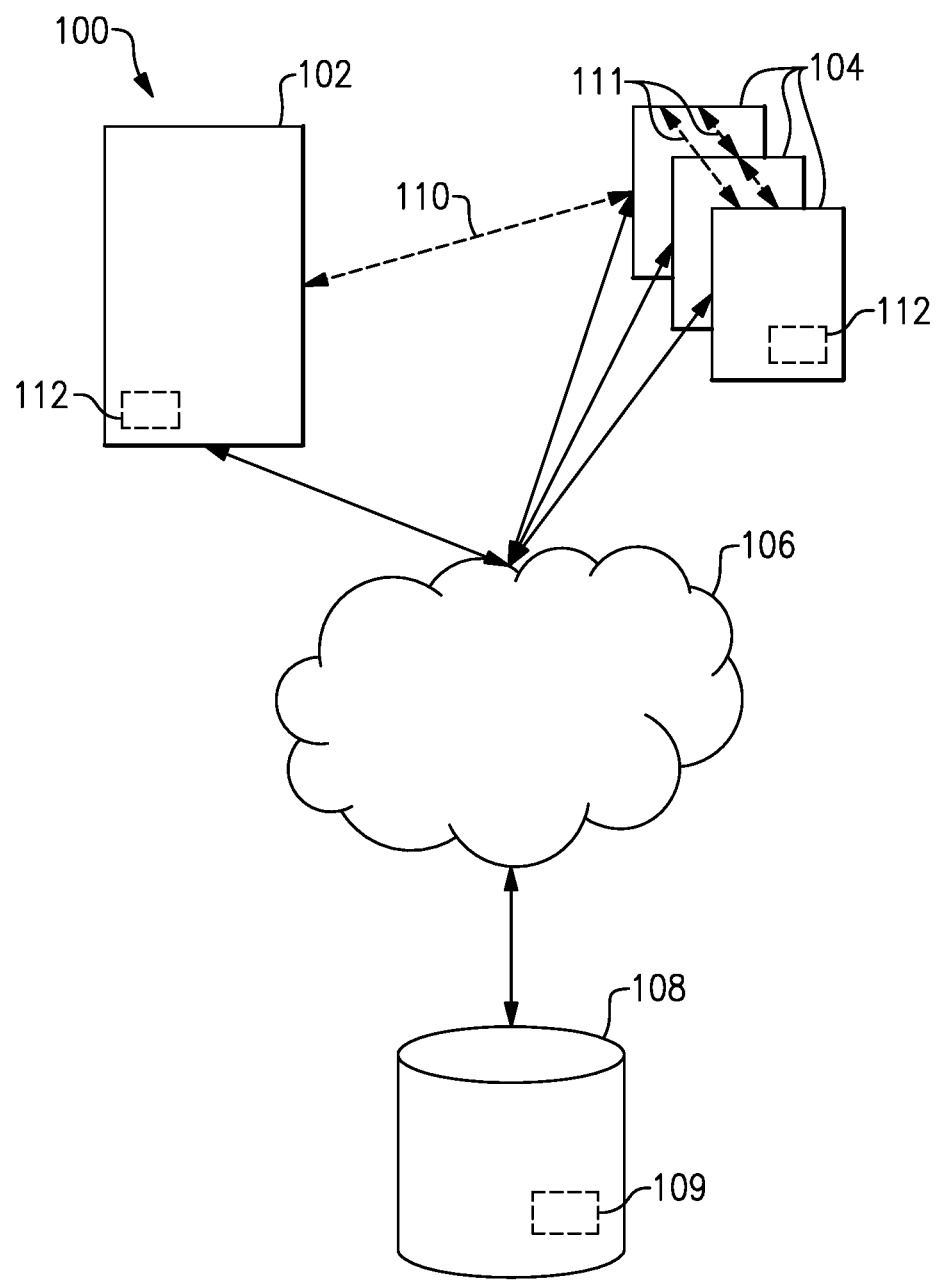
FIG. 1 illustrates a system for a multi-user CAx environment, according to an embodiment.

FIG. 1 illustrates an embodiment of a computing architecture or system 100 for executing a multi-user CAx environment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponds to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component or sub-component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, a relative or absolute spatial position or orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one custom layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to make modifications to various aspects of a component design corresponding to one or more part files. In some embodiments, the part file is stored locally at the storage system 108, with local copies of the part file at the client computers 104 being synchronized periodically. Modifications to each part file are communicated to each CAx environment currently accessing the part file, either in real-time or periodically utilizing a synchronization scheme. Display or visualization of the modification is therefore made substantially immediately available in CAx environments accessing the same part file, which can assist the multiple users in identifying conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for example. Accordingly, it may be desirable to limit the visualization of a particular aspect of a component design depending on the level(s) of access provided to a particular user profile. Each user profile corresponds to one or more access lists setting the level(s) of access for each user profile.

Figure 2A:
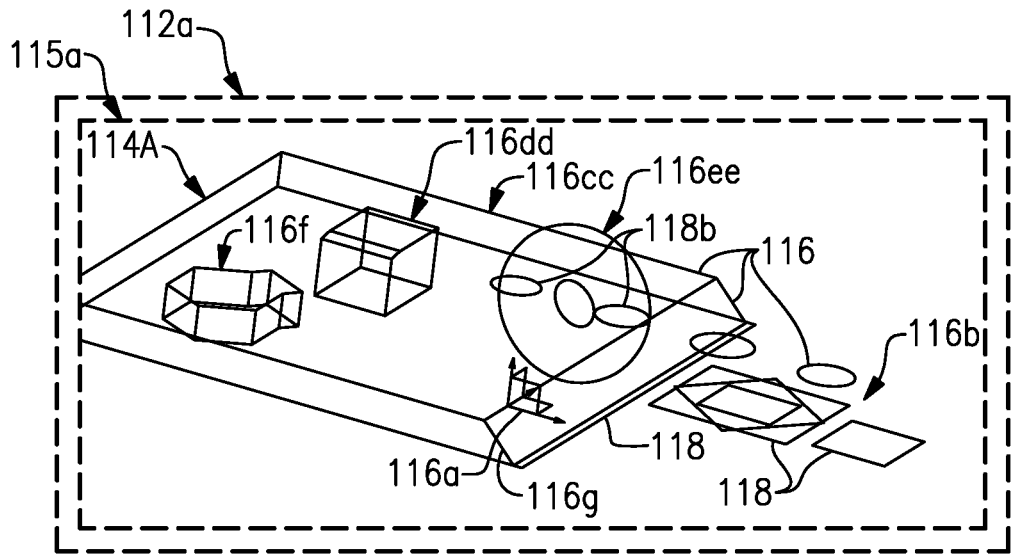
FIG. 2A illustrates a sample component design displayed in a first CAx environment, according to an embodiment.
Figure 2B:
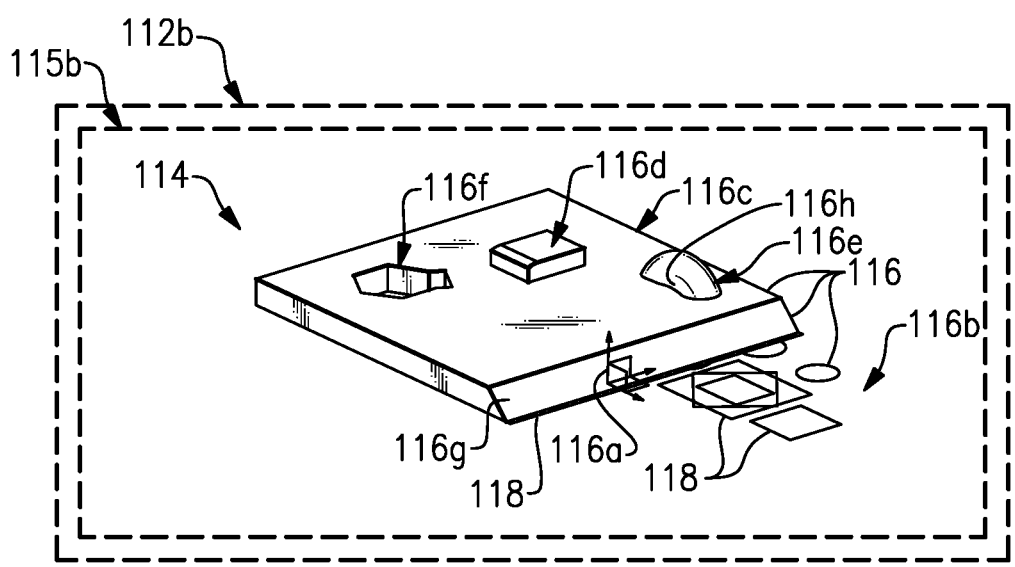
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. In some examples, the features 116 can correspond to sub-components configured together to create the design 114. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

When a particular sub-component, or feature is released for production, the specifications of that sub-component are necessarily locked in, and cannot be changed. If subsequent alterations to other sub-components within the component modify the released sub-component, the resultant structure can be incompatible with the released sub-component resulting in either unusable work within the multi-user CAx environment, or unusable released sub-components being manufactured. Absent some form of release tracking within the multi-user CAx system, there is no methodology to prevent a user from modifying the released subcomponent and no way of notifying the user that a particular sub-component has been released for production.

With continued reference to FIGS. 1, 2A and 2B, FIG. 3 schematically illustrates another example embodiment of a system for a multi-user CAx environment 112. The exemplary system of FIG. 3 includes a release tracking module 120a, 120b within the multi-user CAx environment 112. The release tracking module 120a, 120b is connected to the part database 109 through the network connection 106, and queries the part database 109 to determine which sub-components, if any, within the part file, have been identified by a user as released for production prior to providing the part file to the corresponding client computer 104.

If any sub-components within the component are released for production, the release tracking module 120a within the multi-user CAx environment 112 on the host computer 102, provides a lock on the sub-component. The lock prevents any changes to the released sub-component initiated from one of the client computers 104 from being applied to the part file by the multi-user CAx environment 112.

Each of the multi-user CAx environments 112 on the client computers 104 similarly includes a release tracking module 120b. The client release tracking modules 120b communicate with the host release tracking module 120a, and provide a visual indication associated with each released sub-component in the corresponding viewing frustum. (See FIGS. 4A, 4B). In some examples, the visual indication is an icon, such as a lock, applied to one or more surfaces of the released sub-component. In alternative examples, the visual indication is a transparency, color, or other shading effect applied to the released sub-component.

With continued reference to FIGS. 1-3, FIGS. 4A and 4B illustrate the sample component design of FIG. 2A displayed in a first CAx embodiment with a sub-component 116d, 116dd released for manufacture, according to an embodiment. Within the viewing frustum 115a, 115b, the released component 116d, 116dd is shown with a unique shading feature on one or more surfaces. The unique shading feature indicates to the user operating the client computer 104 on which the viewing frustum 115a, 115b is shown that the shaded sub-component has been released for production. In alternative examples, a specific color can be utilized, or an icon displayed on each surface of the sub-component 116d, 116dd.

Figure 3:
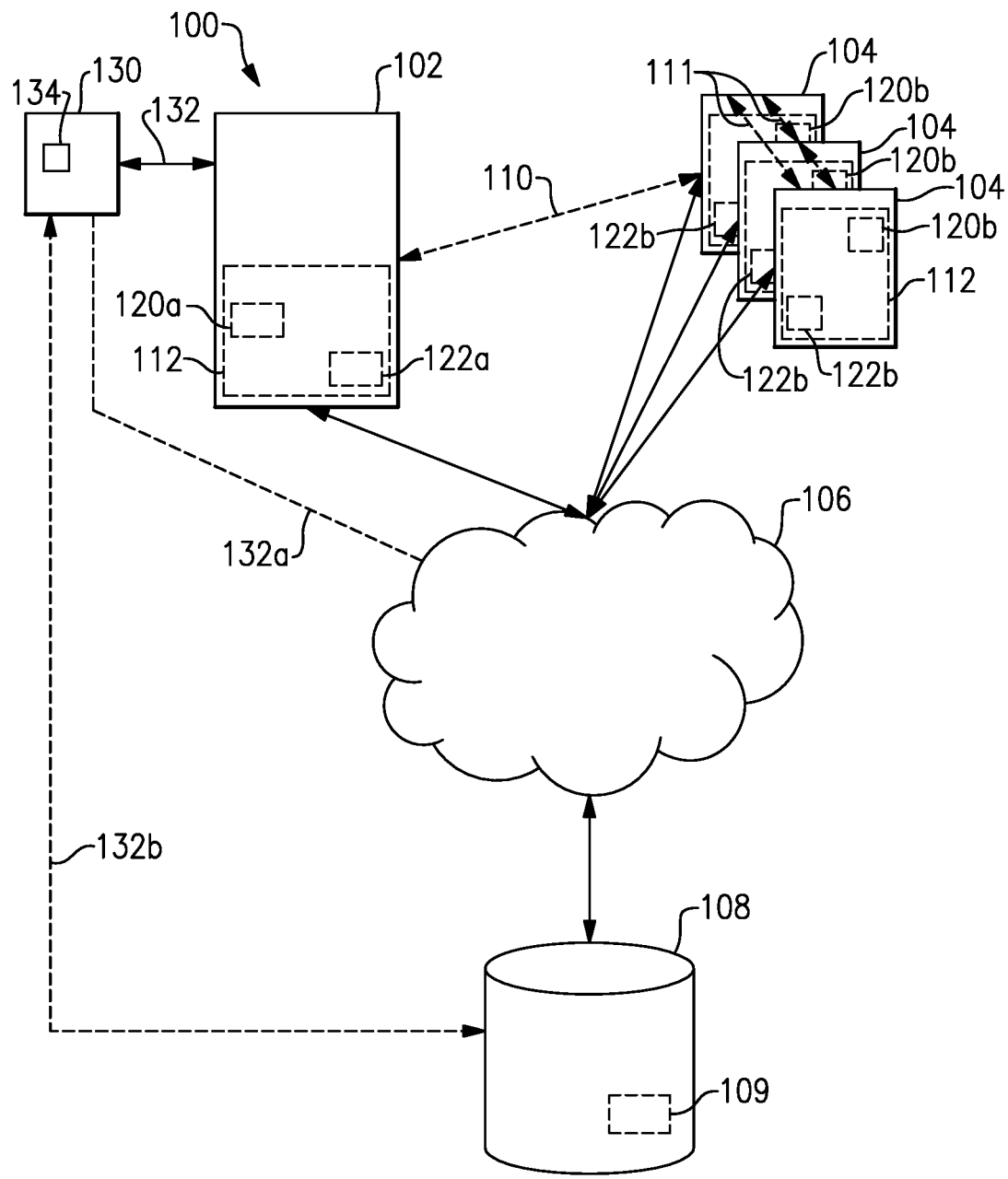
FIG. 3 illustrates a system for a multi-user CAx environment including a release tracking system, according to an embodiment.
Figure 4A:
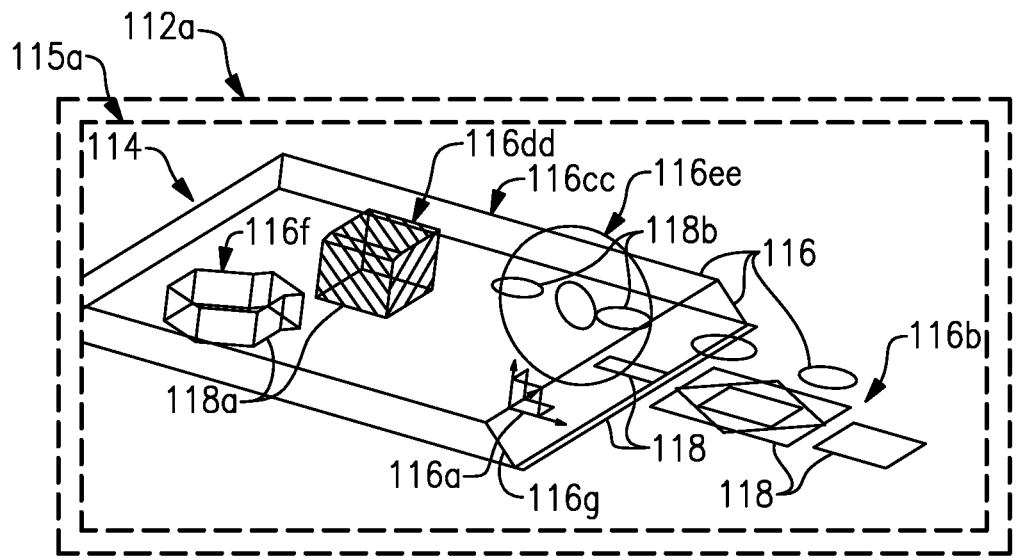
FIG. 4A illustrates the sample component design of FIG. 2A displayed in a first CAx embodiment with a sub-component released for manufacture, according to an embodiment.
Figure 4B:
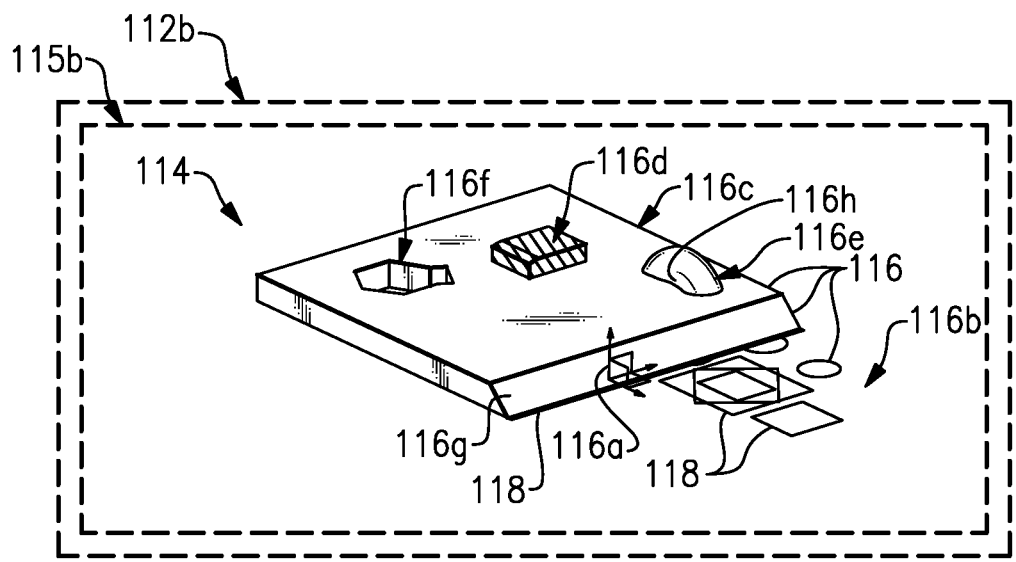
FIG. 4B illustrates the sample component design of FIG. 4A with the sub-component released for manufacture, in a second CAx environment, according to an embodiment.
Figure 5:
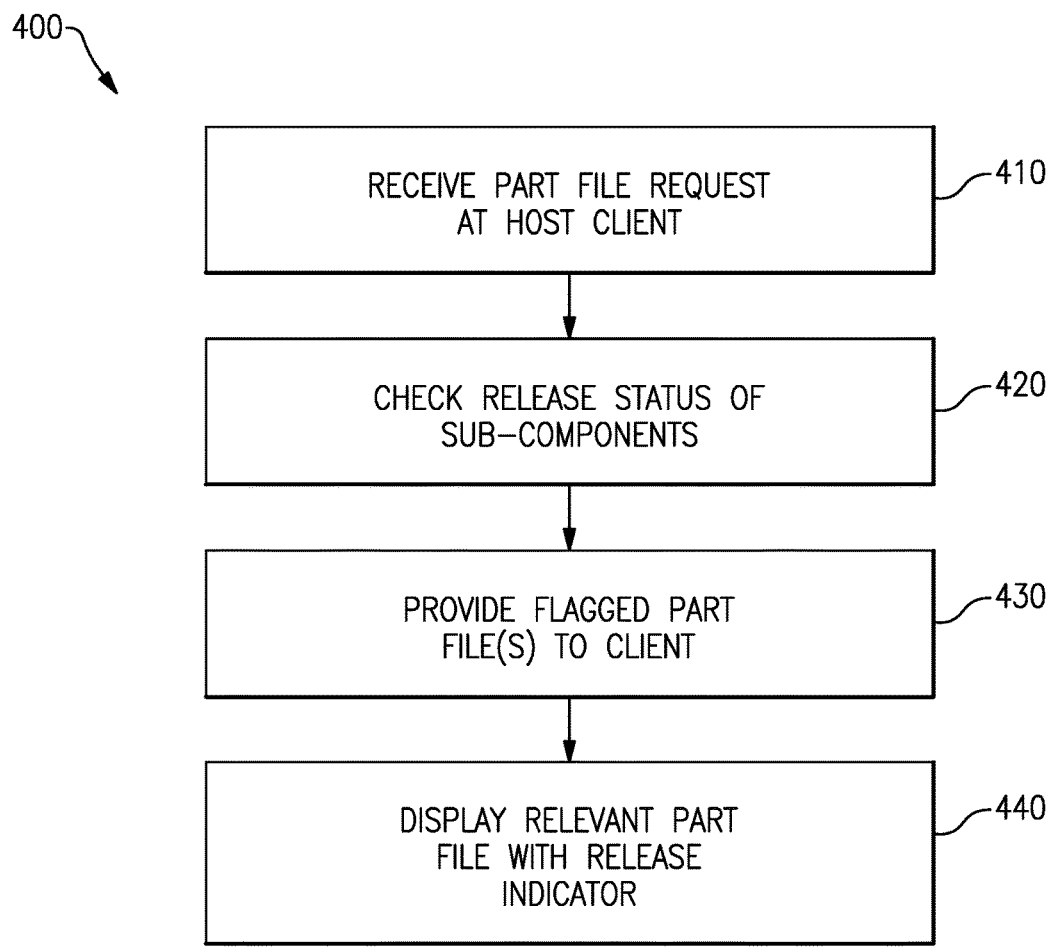
FIG. 5 illustrates one example method of implementing the above described release tracking, according to an embodiment.
Figure 6:
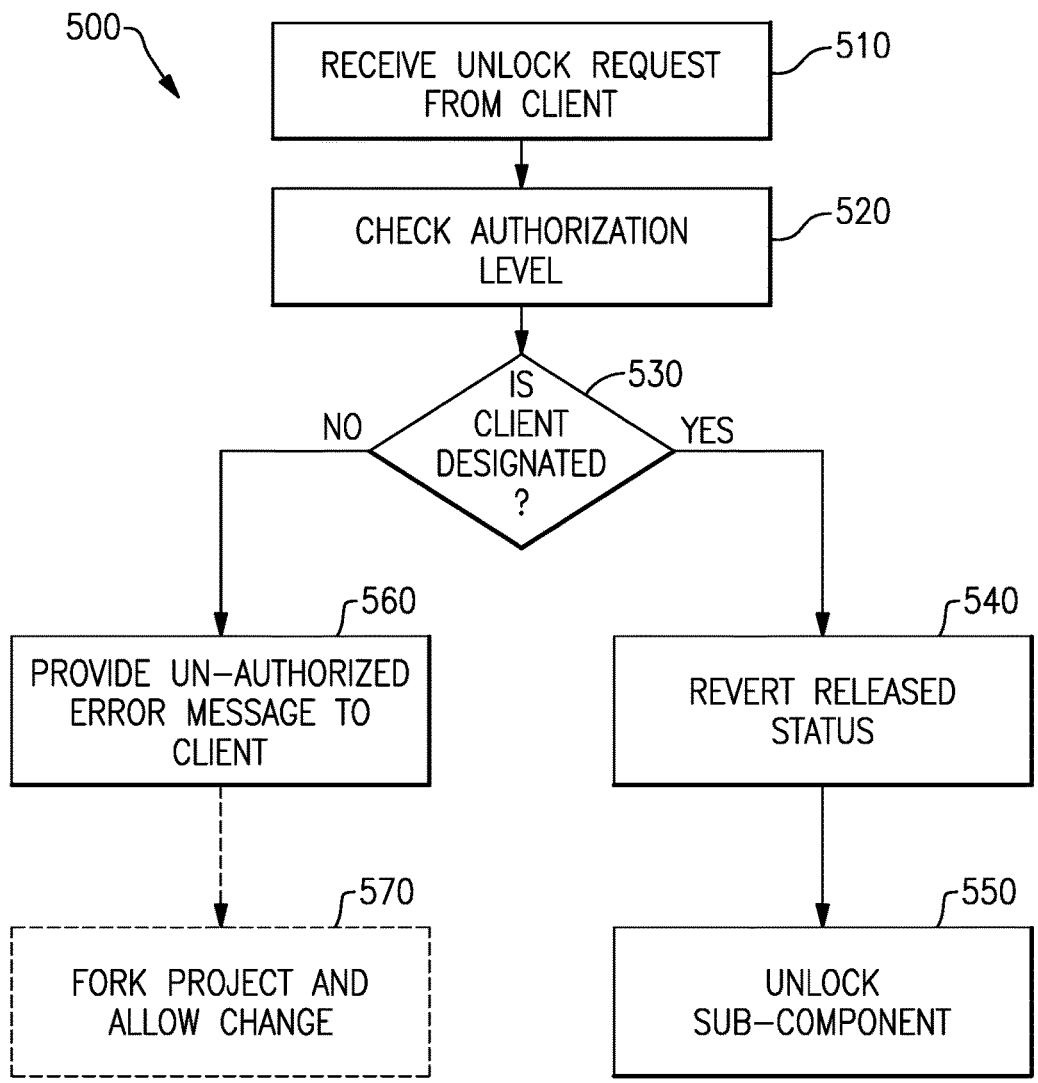
FIG. 6 illustrates a process for responding to a request to revert a released status of a sub-component in the system of FIG. 3, according to one example embodiment.

With reference no to FIGS. 3, 4A and 4B, in some embodiments, the host multi-user CAx environment 112 can also include a user authorization module 122a. In such embodiments, a corresponding user authorization module 122b can be included in each of the client multi-user CAx environments 112. The authorization modules 122a, 122b operate in conjunction with each other to assign a user level to each client computer 104. The user level can provide access to various features and permissions depending on the particular authorization provided to a given client computer 104.

In relation to the release tracking module 120a, 120b, one of skill in the art will understand that in some cases a revision is needed after a sub-component has been released for production. In such an example, the authorization modules 122a, 122b allow users with an authorization level at or above a predetermined authorization level to remove the lock applied to the released component by the release tracking module 120a, 120b, and allow changes to the released subcomponent. In some example embodiments, the user authorization module 122a, allows only authorized client computers 104 to alter the released sub-components. In alternative example embodiment, the authorization modules 122a, 122b remove the released status from the sub-component, and any client computer 104 can affect changes in the formerly released sub-component. In either case, multi-user CAx environments 112 operated by a user with sufficient authorization are referred to as designated multi-user CAx environments 112.

In some example embodiments, a product life management system (PLM system) 130 is utilized in conjunction with the multi-user CAx system. The PLM system 130 is connected to the host computer 102 via a data connection 132. While illustrated as a direct link 132, one of skill in the art will understand that alternative connections facilitated by the network 106 can be utilized in place of, or in addition to, the illustrated direct connection 132. Further, in some examples, the PLM system 130 is incorporated in the host computer 102 as a distinct software module, rather than being a distinct hardware element connected to the host computer 102. In yet further examples, the PLM system 130 can be connected to the database 109 via a connection 132a to the network 106. Alternatively, the PLM system 130 can be connected to the database 109 via a direct connection 132b in some example embodiments.

The PLM system 130 tracks and manages the life cycle of an existing product, including the released status of components and sub-components. When a component is released for production, the PLM system 130 communicates with the release tracking module 120a such that all sub-components within the component are similarly flagged as released regardless of whether such a flag has been provided from one of the client computers 104.

Further, in some examples, a released flag set by the PLM system 130 can have a different level of authorization required to override or revert the released status than a release status applied by a user at a client computer 104.

Another feature capable of being implemented via the inclusion of the PLM system 130, is a forking module 134 included within the PLM system 130. When a user at a client computer 104 attempts to modify a released component, the forking module 134 can create a product fork (parallel part model) within the PLM system 130. The product fork allows the user at the client computer 104 to alter the component file, and save the alterations, as a new part file without altering the released component.

With continued reference to FIGS. 3, 4a, and 4b, FIG. 5 illustrates one example method 400 of implementing the above described release tracking, according to an embodiment. Initially, the multi-user CAx environment 112 on the host computer 102 receives a part file request from one or more multi-user CAx environments being operated on client computers 104 in a "Receive Part File Request at Host Client" step 410.

Once the relevant part file has been identified, the release tracking module 120a in the multi-user CAx environment 112 on the host computer 102 checks the release status of each sub-component in the requested part file in a "Check Release Status of Sub-Components" step 420. During this step 420, the release tracking module 120a queries the database 109 to determine the release status of any sub-components being requested by the multi-user CAx environments 112 being operated on client computers 104. Any sub-components that are released are flagged as being a released sub-component by the release tracking module 120a.

In example embodiments including a product life management (PLM) system 130, the PLM system 130 is checked in step 420 as well. If the part, including all the sub-components, is released for production, the overall part is flagged as released, as well as each individual sub-component.

Once all requested sub-components have been checked against the database 109, the multi-user CAx environment 112 operating on the host computer 102 provides all the requested part files, including the flagged part files, to the multi-user CAx environments 112 being operated on the client computers 104 in a "Provide Flagged Part File(s) to Client" step 430.

Each of the multi-user CAx environments 112 operating on a client computer 104 includes a client release tracking module 120b. The client release tracking module 120b identifies any sub-components within the part file(s) that are flagged as being released, and applies a corresponding notification to the display of the released sub-components in a "Display Relevant Part File with Release Indicator" step 440. As indicated previously, the release indicator can be any visual que within the corresponding viewing frustum that associates a given sub-component with a released status. By way of example, the release indicator can be an icon on one or more surfaces of the component, a specific color applied to the component, or a specific shading feature applied to the component.

In alternative example embodiments, such as a thin client architecture, the functions of both the host release tracking module 120a and the client release tracking module 120b can be incorporated into a single release tracking module within the host computer 102. In such an example, the release status indicator is provided to the multi-user CAx environments 112 operating on the client computers 102 as a part of the viewing information.

With reference again to the system of FIGS. 3, 4A, and 4B, FIG. 6 illustrates a process for responding to a request to revert a released status of a sub-component in the system of FIG. 3, according to one example embodiment. Initially a multi-user CAx environment 112 operating on a client computer 104 originates a request to revert a "released" flag on one or more sub-components that the user of the client multi-user CAx environment 112 wishes to modify. The request is received at the multi-user CAx environment 112 on the host computer 102 in a "Receive Unlock Request From Client" step 510. The request can originate via any number of operations including, but not limited to, an express command to revert a released status and an attempt to perform an operation that would modify one or more aspects of the released sub-component.

Once the request is received by the multi-user CAx environment 112 operating on the host computer 102, the authorization module 122a on the host computer 102 checks the authorization level of the user operating the multi-user CAx environment 112 on the client computer 102 originating the request in a "Check Authorization level" step 520. Authorization levels can be tracked through any number of known authorization systems. In some example embodiments, the authorization level is a user access level assigned to each individual access and is specific to the user. In alternative examples, the user who originally indicated that the sub-component is "released" is authorized. Alternative examples can operate as a combination of the two.

Once the authorization level of the user is determined, the authorization module 122a on the host computer checks the authorization level against a preset threshold and determines if the corresponding client is designated as being able to revert a released flag, in a "Is Client Designated?" check 530. If the client is designated, the authorization module 122a in the multi-user CAx environment 112 operating on the host computer 102 reverts the released status in a "Revert Released Status" step 540. The reversion of the released status includes a communication from the authorization module 122a to either the database 109, the PLM system 130, or both, and effects a change in the data stored in the corresponding system.

The authorization module 122a then unlocks the sub-component in an "Unlock Sub-Component" step 550 and allows the multi-user CAx environment 112 operating on the corresponding client computer 104 to alter the formerly released sub-component. In some example embodiments, the reversion is temporary, and the sub-component is only reverted to unreleased status until the end of the current multi-user CAx system session. In alternative embodiments, the reversion can be permanent until a user re-flags the sub-component as being released.

Alternatively, if the multi-user CAx environment 112 at the client computer 104 where the request originated is not a designated client 104, then the authorization module 122a provides an error message to the client in a "Provide Un-Authorized Error Message to Client" step 560. In most example embodiments, once the error message is provided, the corresponding client computer 104 ceases the operation that attempted to modify the released sub-component.

In some example systems, particularly those including a PLM system 130, the error message provided to the client computer can include an option to fork the part within the PLM system 130 and create a new part file with the requested change. In such an example, after provision of the error message, the PLM system generates the forked product path in a "Fork Project and Allow Change" step 570.

One of skill in the art will understand that the above exemplary embodiments are purely exemplary in nature, and are not limiting. Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component comprising:
a first computing device configured to execute a first multi-user CAx environment, the first multi-user CAx environment including an authorization module configured to prevent a non-designated second multi-user CAx environment from reverting a released status while allowing a designated second multi-user CAx system to revert the released status;
wherein a designated second multi-user CAx system includes at least one other multi-user CAx environment originating the released status and at least one other multi-user CAx environment operated by a user having a user access level in excess of a specified pre-determined threshold;
wherein the designated second multi-user CAx system is enabled to request to temporarily revert the released status for a duration of a session of the designated second multi-user CAx system; and
wherein the released status indicates a completed sub-component released from production and locks the subcomponent from further editing;
a plurality of second computing devices, each being configured to execute a corresponding second multi-user CAx environment;
each of said second multi-user CAx environments including a display module configured to cause the corresponding second device to display at least a portion of a component, the component including a plurality of subcomponents wherein at least one of the subcomponents has the released status applied;
the first multi-user CAx environment including a first release tracking module configured to cause each of said second multi-user CAx environments to display a visual indication of a released status of the released subcomponent; and
wherein each of said second multi-user CAx environments includes a second release tracking module, each of the second release tracking modules being configured to operate in conjunction with the first release tracking module and being configured to apply the visual indication based on a released status received from the first release tracking module.

2. The system of claim 1, wherein the visual indication is an icon displayed on at least one surface of the released subcomponent.

3. The system of claim 1, wherein the visual indication is one of a shading effect and a transparency effect applied to a visual representation of the released subcomponent.

4. The system of claim 1, further comprising a product life management (PLM) system connected to the first computing device, and wherein a released status of each subcomponent and a released status of the component is stored in the PLM system.

5. The system of claim 4, wherein the first multi-user CAx system is configured to indicate a status of each subcomponent as released in response to said PLM system indicating said component is released.

6. A method for operating a multi-user CAx environment including a host computer, the method comprising:
receiving a request to access at least a portion of a part file at the host computer from at least two distinct client computers, each of said client computers and said host computer operating a shared multi-user CAx environment;
checking a release status of each of a plurality of sub-component within said at least a portion of the part file at the host computer using a first release status tracking module by querying a connected product life management (PLM) system, and flagging all sub-components within said plurality of sub-components with a released status when said part file is listed as being released in said PLM system;
wherein the released status indicates a completed sub-component released for production and locks the sub-component from further editing;
providing a released status designation of each sub-component with the plurality of sub-components to at least one second release status tracking module from the first release status tracking module, each of the at least one second release tracking module being implemented at a different client computer, the released status designation causing a visual indication on a released sub-component to be provided within said plurality of sub-components in a viewing frustum of each of said client computers, the visual indication indicating that the sub-component is released;
receiving a temporary reversion request from a requesting client computer; and responsive to determining that the requesting client computer originating the request is a designated computer, authorizing a temporary reversion of the released status from the duration of a session of the requesting client computer, wherein the requesting client computer is determined to be a designated computer in response to the host computer determining that the user operating the client computer originating the request is a user who originated the released status.

7. The method of claim 6, wherein providing a visual indication comprising at least one of displaying an icon on one or more surfaces of the released sub-component, coloring one or more surfaces of the released sub-component, and shading one or more surfaces of the released sub component.

8. The method of claim 7, further comprising preventing operations originating from each of said client computers from altering the released sub-component.

9. The method of claim 6, wherein the client computers is determined to be a designated computer in response to an authorization module determining that a user operating the client computer originating the request has an authorization in excess of a predetermined authorization threshold.

10. The method of claim 6, further comprising forking a part file in a connected product life management (PLM) system in response to a non-designated client attempting an operation that would modify a released sub-component within said plurality of sub-components.

* * * * *